Aug. 16, 1949.  K. WILLIAMS  2,479,444

FRICTION SHOCK ABSORBER

Filed July 29, 1946

Inventor:
Keith Williams.
By George I. Haight
Atty.

Patented Aug. 16, 1949

2,479,444

UNITED STATES PATENT OFFICE 2,479,444

FRICTION SHOCK ABSORBER

Keith Williams, Buffalo, N. Y.

Application July 29, 1946, Serial No. 686,812

5 Claims. (Cl. 213—34)

This invention relates to improvements in friction shock absorbers especially adapted for railway cars.

One object of the invention is to provide a friction shock absorber comprising a friction casing having a friction shell section at one end thereof and a spring cage section rearwardly of the friction shell, a friction clutch within the friction shell section, a spring resistance within the spring cage section, and a preliminary spring cap telescoped within the spring cage end of the casing, wherein the cap and casing have shouldered engagement with each other to limit outward movement of the cap and hold the same assembled with the casing and the cap is locked against removal from the casing by simple and efficient means which may be readily unlocked from the cap to permit removal of the latter from the casing.

A further object of the invention is to provide a friction shock absorber of the character indicated, wherein the spring cap and casing have interengaging, registering stop lugs which limit outward movement of the cap and hold the same assembled with the casing and the cap is locked against rotation with respect to the casing to maintain the interengaging lugs of the same and the casing in alignment.

A more specific object of the invention is to provide a friction shock absorber including a friction casing having interior friction surfaces at one end thereof, a preliminary spring cap telescoped within the other end of the casing, a friction clutch slidable within the casing, including a wedge block and friction shoes having wedging engagement with each other, the shoes having sliding engagement with the friction surfaces of the casing, and spring resistance means within the casing opposing inward movement of the shoes and spring cap, wherein the wedge has shouldered engagement with the casing to limit outward movement of the wedge, and wherein the spring cap is assembled with the casing by applying the same after the clutch and spring resistance have been placed within the casing, and is held assembled with the casing by interengaging means on the cap and casing including circumferentially spaced retaining lugs on the casing and aligned cooperating, circumferentially spaced retaining lugs on the cap, the cap being locked against rotation with respect to the casing by a retaining element restricted to movement lengthwise of the casing and held in interlocked engagement with the cap by the yielding pressure of the spring resistance means.

A still further object of the invention is to provide a shock absorber as set forth in the preceding paragraph, wherein the parts are proportioned so that the lugs of the cap will pass freely between the lugs of the casing to permit application of the cap by axial movement of the latter inwardly of the casing to position the lugs of the cap inwardly of the lugs of the casing and the cap may be turned to bring the lugs thereof in aligned cooperating relation with the lugs of the casing.

Other objects of the invention will more clearly appear from the description and claims hereinafter following.

In the drawing, forming a part of this specification,

Figure 1:
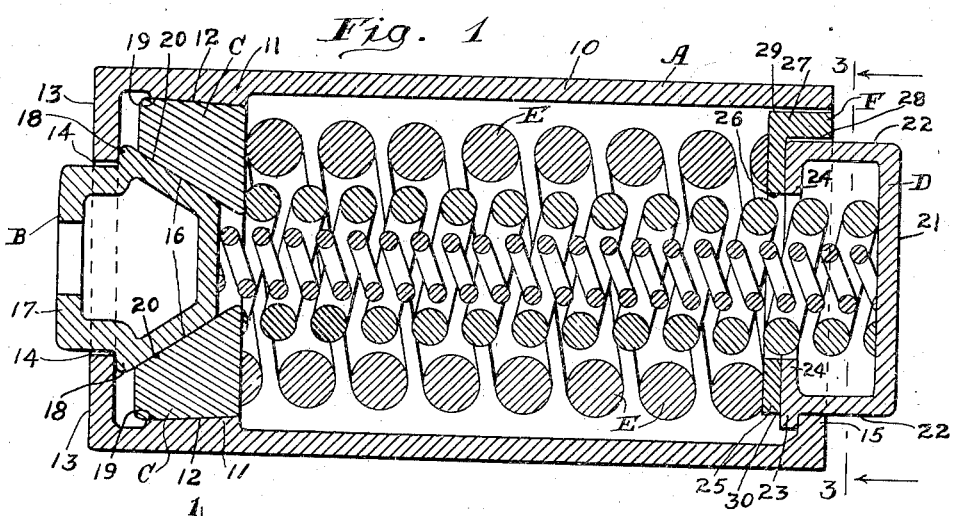
Fig. 1 is a longitudinal, vertical sectional view of a friction shock absorber embodying my invention, the section of the left portion thereof being taken on the line 1—1 of Fig. 2.
Figure 2:
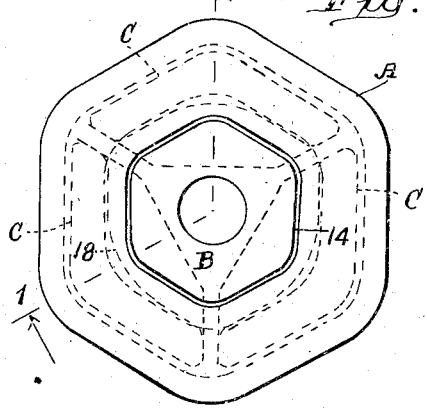
Fig. 2 is a front elevational view of Fig. 1, looking from left to right in said figure.
Figure 3:
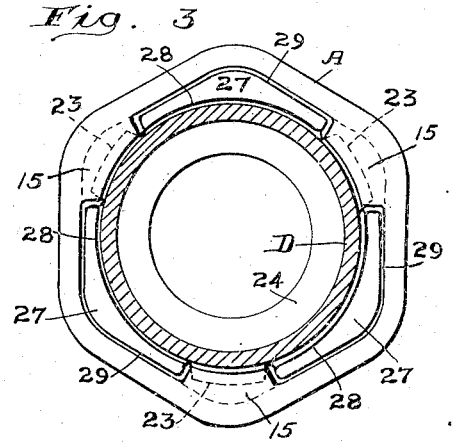
Fig. 3 is a transverse, vertical sectional view, corresponding substantially to the line 3—3 of Fig. 1.
Figure 4:
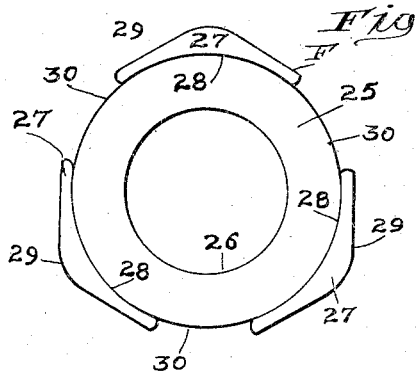
Fig. 4 is an elevational view of the locking element for the spring cap, looking from right to left in Fig. 1.
Figure 5:
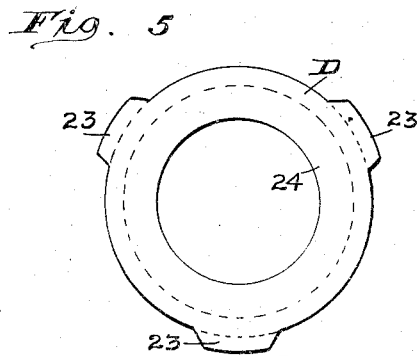
Fig. 5 is an elevational view of the spring cap of my improved mechanism, looking from left to right in Fig. 1.

As shown in the drawing, my improved shock absorber comprises broadly a friction casing A, a wedge B, three friction shoes C—C—C, a preliminary spring cap D, a spring resistance E, and a locking element F.

The casing A is in the form of a tubular shell of hexagonal interior and exterior cross-section. The side walls of the casing, which are indicated by 10, are inwardly thickened at the front end of the casing, as indicated at 11. The thickened wall portion of the casing presents six lengthwise disposed, inwardly converging friction surfaces 12, which are spaced symmetrically about the central longitudinal axis of the mechanism. The friction surfaces 12 are arranged in pairs, the adjacent surfaces of each pair together forming a friction face of V-shaped transverse contour. At the open front end thereof, the casing is provided with a continuous, inturned stop flange 13 defining an opening 14 of hexagonal shape. At the rear end, the casing is provided with three inturned stop ledges or lugs 15—15—15, which are located at alternate corners of the casing.

The wedge B is in the form of a hollow block having three inwardly converging wedge faces 16—16—16 of V-shaped transverse cross-section, which are arranged symmetrically about the longitudinal axis of the mechanism. At the outer end, the wedge is reduced in size, said reduced portion being in the form of a hexagonal projection 17 extending through the opening 14 defined by the flange 13. The projection 17 protrudes from the casing, as shown in Fig. 1, and has a flat, transverse outer end face adapted to receive the actuating force. This reduced portion of the wedge provides a continuous shoulder 18 therearound at the inner end of the projection 17 adapted to engage in back of the flange 13 of the casing to limit outward movement of the wedge.

The shoes C, which are three in number, are arranged between the wedge faces of the wedge B and the friction surfaces of the casing. Each shoe C has an outer friction surface 19 of V-shaped transverse section engaging with the corresponding V-shaped friction face formed by two adjacent surfaces 12—12 of the casing. Each shoe has a wedge face 20 of V-shaped transverse section on its inner side correspondingly inclined to and engaging with one of the wedge faces 16 of the wedge B. At the rear end, each shoe has a flat transverse face forming an abutment for the spring resistance E.

The spring cap D is of cup-shaped form having a transverse outer end wall 21 and a cylindrical side wall 22. At the inner end of the cap, the side wall 22 is provided with three circumferentially spaced, radial flanges or lugs 23—23—23 and an inturned annular flange 24 in transverse alignment with the lugs and forming an abutment for the locking element F. The spring cap D extends through the space or opening between the flanges or lugs 15—15—15 of the casing A and has the radial lugs 23—23—23 thereof aligned with said lugs 15—15—15. In the normal position of the parts of the mechanism, the lugs 23—23—23 engage the lugs 15—15—15, thereby limiting outward movement of the cap.

The locking element F, which is in the form of a ring of broadly hexagonal exterior outline, comprises a flat platelike portion 25 of substantially hexagonal outline provided with a central opening 26 therethrough. The platelike portion 25 has three circumferentially spaced flanges or tongues 27 extending rearwardly therefrom. The flanges or tongues 27 are located at alternate corners of the plate and each tongue 27 presents a curved inner wall 28, which is concentric with the side wall 22 of the cap D, and a V-shaped outer wall 29, which extends in opposite directions from the corner of the plate and is flush and continuous with the corresponding side edge of said plate. The corners of the plate between the tongues 27 are cut out or notched, as indicated at 30, to clear the lugs 15 of the casing in assembling the mechanism. The locking element or ring F is slidably guided within the casing, the hexagonal outline of the former closely fitting the hexagonal interior of the casing whereby the locking element is held against rotation.

In the assembled condition of the mechanism, the locking element F has the plate section 25 thereof bearing on the inner end of the cap D with the tongues 27 embracing the cap between the lugs 23 thereof, the tongues substantially filling the spaces between these lugs, thereby holding the cap against rotation with respect to the locking element. The tongues 27 are preferably of such a length that they project between adjacent lugs 15 of the casing A and have their outer ends flush with the rear end of the casing when the cap is in its outermost position with the lugs 23 thereof engaged with the lugs 15 of the casing. As will be evident, the cap D is thus locked against rotation with respect to the casing by the locking element F, which in turn is locked to the cap D by the tongues 27 and held against rotation by engagement with the hexagonal interior of the casing, the walls 10 of the casing acting as guides which limit the locking element to movement in a direction lengthwise of the casing.

The spring resistance E, which is disposed within the casing A, preferably comprises three coils—a relatively heavy outer coil, a central coil, and an intermediate coil within the outer coil and surrounding the inner coil. The outer coil has its front and rear ends bearing respectively on the inner sides of the shoes C and the locking element F. The central coil has its front and rear ends bearing respectively on the inner end of the wedge B and the end wall 21 of the cap D, and the intermediate coil has its front and rear ends bearing respectively on the shoes C and the end wall 21 of the cap. The three coils of the spring resistance E are preferably under initial compression in the assembled condition of the mechanism.

In assembling the mechanism, the wedge B, the three shoes C—C—C, and the spring resistance E are inserted within the casing A through the open rear end thereof, the casing being preferably stood on end on a suitable support. The front end of the friction casing A is buttressed against this support with the wedge free so that it remains in the projected position shown in Fig. 1. The locking element F is then pushed into the rear end of the casing with the tongues 27—27—27 thereof aligned with the openings between the lugs 15—15—15, the notches 30—30—30 of the element F providing clearance for the lugs 15—15—15. The element F is forced against the resistance of the outer coil spring and moved inwardly to such an extent that the outer ends of the tongues 27 are spaced inwardly from the inner sides of the lugs 15 to permit the lugs 23 of the cap D to pass edgewise therebetween. While the element F is being held in this position, the cap D is placed over the outer ends of the inner and intermediate springs with the lugs 23 of said cap displaced circumferentially to one side of the lugs 15 of the casing so as to clear the last named lugs as the cap is moved into the casing. The cap is then forced inwardly against the resistance of the inner and intermediate springs until the lugs 23 of the cap reach a position inwardly or in back of the lugs 15. The cap is then given a turn to register the lugs 23 with the lugs 15 of the casing. The pressure is then removed from the locking element F, permitting the outer spring to project said element and engage the tongues 27 thereof between the lugs 23 of the cap, thereby locking the cap against rotation.

As is well known to those skilled in this art, my improved shock absorber is mounted on the railway car between the usual front and rear followers and is compressed therebetween during both draft and buffing actions. In the operation of my improved shock absorber, as the same is being compressed, the preliminary spring cap D is first forced inwardly against the spring resistance E, the friction existing between the shoes and the casing being too great to permit inward movement of the clutch until the spring cap D has been forced inwardly to the full extent of its movement and the cooperating follower of the draft rigging engages with the rear end of the casing A. This compression of the spring E takes care of the lighter shocks encountered in service. After the casing is engaged by the rear follower of the draft rigging, the wedge B is compelled to move inwardly with respect to the casing A, spreading the shoes C—C—C apart and forcing the same inwardly along the friction surfaces of the casing with resultant high frictional resistance being produced.

When the actuating force is reduced, the parts of the shock absorber are all restored to the normal full release position shown in Fig. 1 by the expansive action of the spring resistance E, outward movement of the wedge B being limited by the stop flange 13 of the casing being engaged by the shoulder 18 of the wedge, and outward movement of the spring cap D being limited by engagement of the lugs 23 thereof with the lugs 15 of the casing.

I claim:

1. In a shock absorber, the combination with a casing; of a spring cap slidingly telescoped within one end of the casing and normally projecting therefrom, said casing and cap having interengaging lugs restricting outward movement of the cap with respect to the casing; a locking ring for holding the cap against rotation with respect to the casing, said ring being movable with the cap, said ring and casing having interengaging guide portions restricting said ring to movement lengthwise of the casing, and said ring and cap having interlocking portions holding the cap against rotation with respect to the ring; and spring means within the casing yieldingly opposing inward movement of the cap and ring, said cap being insertable through said end of the casing in position with the lugs thereof disposed circumferentially to one side of the lugs of the casing, and being brought into position to overhang said lugs of the casing by turning of said cap.

2. In a shock absorber, the combination with a casing having an open end and circumferentially spaced, interior stop lugs at said open end; of a spring cap having radially projecting stop lugs engaging the stop lugs of the casing to restrict outward movement of the cap, said cap being insertable within the casing through said open end thereof with the lugs of the cap circumferentially displaced to one side of the lugs of the casing, said lugs of the cap being brought into alignment with and in back of the lugs of the casing by turning the cap about its longitudinal axis; a locking ring for holding said cap against rotation with respect to the casing, said ring and casing having interengaging guide portions to restrict said ring to movement in a direction lengthwise of the casing, said ring having projecting tongues embracing the cap and engaging between the lugs thereof to lock the cap against rotation with respect to said ring; and spring means within the casing yieldingly resisting inward movement of the cap and locking ring.

3. In a shock absorber, the combination with a casing; of a friction clutch slidingly telescoped within one end of the casing; a spring cap slidingly telescoped within the other end of the casing; inturned, circumferentially spaced stop lugs at said second named end of the casing; radial stop lugs on the cap engageable with the stop lugs of the casing to limit outward movement of the cap; a locking ring bearing on said cap, said ring and casing having interengaging guide portions restricting said ring to movement in a direction lengthwise of the casing; locking projections on the ring engaged between the lugs of the cap to hold the latter against rotation with respect to the ring, said cap being rotatable to dispose the lugs thereof circumferentially to one side of the lugs of the casing to clear the latter when said ring is displaced inwardly of the casing with respect to the cap to unlock the same from the cap; and spring means within the casing bearing at one end on said clutch and at the other end on said cap and yieldingly opposing inward movement of the clutch, cap, and ring.

4. In a shock absorber, the combination with a casing having an open end and circumferentially spaced, interior stop lugs at said open end; of a spring cap having radially projecting stop lugs engaging the stop lugs of the casing to restrict outward movement of the cap, said cap being insertable within the casing through said open end thereof with the lugs of the cap circumferentially displaced to one side of the lugs of the casing, said lugs of the cap being brought into alignment with and in back of the lugs of the casing by turning the cap about its longitudinal axis; a locking ring for holding said cap against rotation with respect to the casing, said ring and casing having interengaging guide portions to restrict said ring to movement in a direction lengthwise of the casing, said ring having projecting tongues embracing the cap and engaging between the lugs thereof to lock the cap against rotation with respect to said ring; a spring within the casing bearing on said ring and yieldingly resisting inward movement thereof; and a second spring within the casing bearing on said cap and yieldingly resisting inward movement thereof.

5. In a shock absorber, the combination with a casing; of a friction clutch slidingly telescoped within one end of the casing; a spring cap slidingly telescoped within the other end of the casing; inturned, circumferentially spaced stop lugs at said second named end of the casing; radial stop lugs on the cap engageable with the stop lugs of the casing to limit outward movement of the cap; a locking ring bearing on said cap, said ring and casing having interengaging guide portions restricting said ring to movement in a direction lengthwise of the casing; locking projections on the ring engaged between the lugs of the cap to hold the latter against rotation with respect to the ring, said cap being rotatable to dispose the lugs thereof circumferentially to one side of the lugs of the casing to clear the latter when said ring is displaced inwardly of the casing with respect to the cap to unlock the same from the cap; a spring within the casing bearing at opposite ends on said clutch and ring; and a second spring within said casing bearing at opposite ends on said clutch and cap.

KEITH WILLIAMS.

REFERENCES CITED

The following references are of record in the file of this patent:

UNITED STATES PATENTS

| Number | Name | Date |
|---|---|---|
| 2,417,154 | Dath | Mar. 11, 1947 |
| 2,421,075 | Lehman | May 27, 1947 |